United States Patent Office.

MORITZ ULRICH, OF ELBERFELD, GERMANY, ASSIGNOR TO THE FARBENFABRIKEN, VORMALS FR. BAYER & CO., OF SAME PLACE.

BLACK AZO DYE.

SPECIFICATION forming part of Letters Patent No. 476,336, dated June 7, 1892.

Application filed November 19, 1891. Serial No. 412,422. (Specimens.)

*To all whom it may concern:*

Be it known that I, MORITZ ULRICH, doctor of philosophy, a subject of the Emperor of Germany, residing at Elberfeld, Germany, (assignor to the FARBENFABRIKEN, VORMALS FR. BAYER & CO., of Elberfeld,) have invented a new and useful Improvement in the Manufacture of a new Black Azo Coloring-Matter, of which the following is a clear and exact description.

My invention relates to the production of a new black azo dye-stuff of high value by combining the diazo compound of beta-naphthylamine monosulpho-acid with alpha-naphthylamine by further diazotizing the amidoazo compound thus obtained and by acting with this diazo derivative upon the sodium salt of the dihydroxynaphthaline monosulpho-acid S of my Letters Patent No. 444,679, dated January 13, 1891.

In carrying out my invention practically I proceed as follows: About twenty-five kilos of the sodium salt of the beta-naphthylamine monosulpho-acid are dissolved in five hundred liters of water, and after adding thirty kilos of hydrochloric acid at 21° Beaumé diazotized by a watery solution of seven kilos of sodium nitrite. The resulting liquid, which contains the formed diazo compound, is thereupon mixed with a watery solution of nineteen kilos of alpha-naphthylamine chlorhydrate. When the conversion of the first-produced diazoamido compound into the amidonaphthaline azonaphthaline sulpho-acid is completed, the latter most practically is filtered off and dissolved in water by the addition of soda. After adding seven kilos of sodium nitrite the liquid is mixed, on cooling, with twenty-five kilos of hydrochloric acid. The diazotation immediately begins, and is finished after twenty-four hours' standing. The thus-obtained precipitate is then introduced into the watery solution of twenty-seven kilos of the sodium salt of the dihydroxynaphthaline monosulpho-acid S and about fifty kilos of sodium acetate. After standing for some hours an excess of sodium carbonate is added to the liquid and the thus-formed sodium salt, which possesses the following composition:

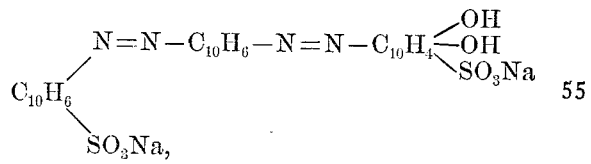

and which represents the new coloring-matter, is salted out with the aid of common salt, then filtered off, and dried.

My new dye-stuff forms in dry state a brownish-black powder, which is soluble in hot water with greenish-black color. On the addition of acids to its watery solutions a dark precipitate is separated. It dissolves in sodium carbonate with blackish-blue color, and the same color is also produced when the watery solutions of the dye-stuff are mixed with soda-lye or ammonia liquid. By concentrated sulphuric acid it is dissolved with deep-green color, which at first changes into blue on the addition of a little quantity of cold water and becomes violet when the sulphuric-acid solution is mixed with an excess of water. At last blue-violet flakes are separated, while the supernatant liquid becomes almost colorless. It dyes unmordanted wool in acid baths a greenish-black, very fast to light, soap, and milling. The shades produced on wool mordanted with chromium salts are greener, resulting from the chromium-lake, which my new dye-stuff is able to form.

Having thus described my invention and in what manner it can be performed, what I claim as new, and desire to secure by Letters Patent, is—

1. The process for producing a new coloring-matter by combining diazotized beta-naphthylamine monosulpho-acid with alpha-naphthylamine, diazotizing the formed amidonaphthaline azonaphthaline sulpho-acid, and by coupling the obtained diazo compound with the sodium salt of the dihydroxynaphthaline monosulpho-acid S.

2. The new dye-stuff, which has the following composition:

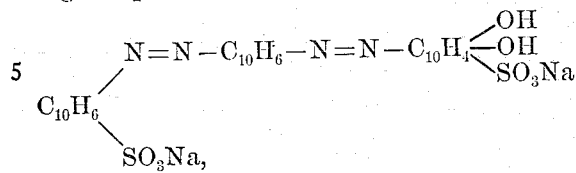

and which is a brownish-black powder, soluble in hot water, with greenish-black color, from which on the addition of acids a dark precipitate is separated, soluble in sodium carbonate, soda-lye, or ammonia liquid, with blackish-blue color, and by concentrated sulphuric acid is dissolved with a deep-green color, which on the addition of water at first becomes blue, then violet, and on further dilution blue flakes separate and the supernatant liquid becomes colorless, and which dyes wool unmordanted a greenish black and wool mordanted with chromium salts greener shades in acid baths.

In testimony whereof I have signed my name in the presence of two subscribing witnesses.

MORITZ ULRICH.

Witnesses:
 WM. ESSENWEIN,
 RUDOLPH FRICKE.